No. 755,750. PATENTED MAR. 29, 1904.
F. B. COREY.
EMERGENCY BRAKE.
APPLICATION FILED JULY 16, 1903.
NO MODEL. 2 SHEETS—SHEET 2.
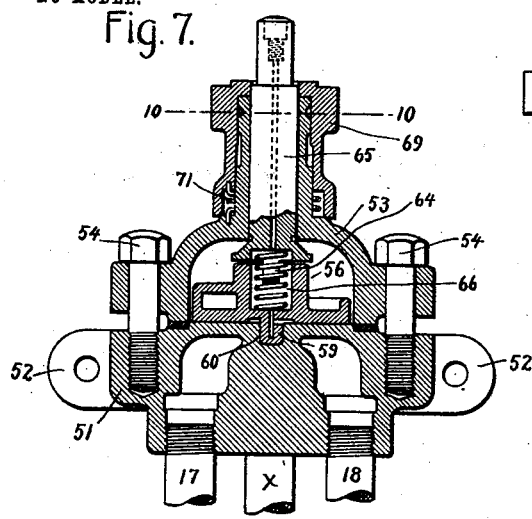
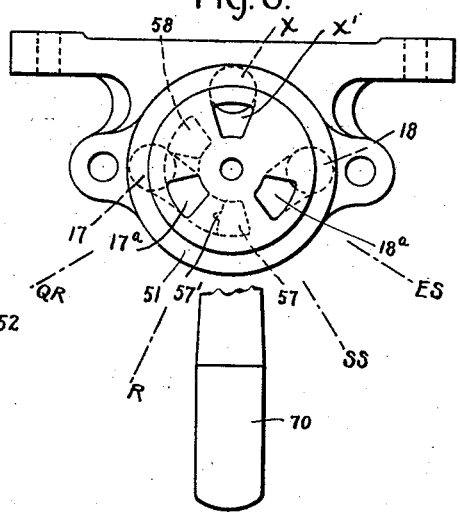
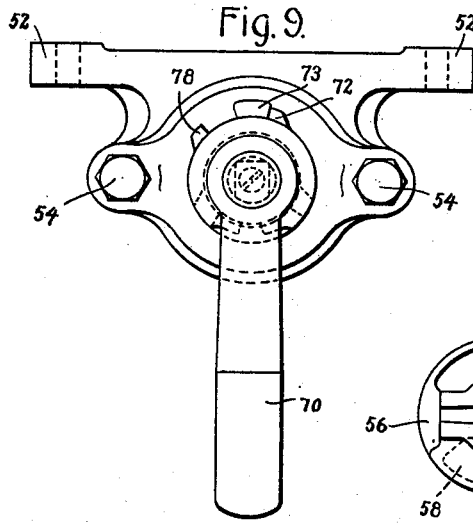
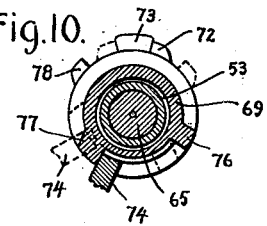
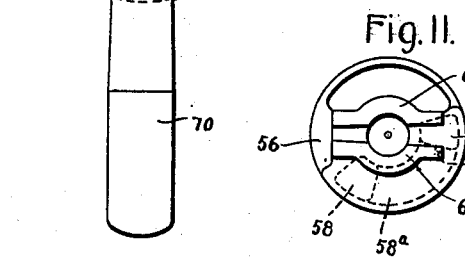
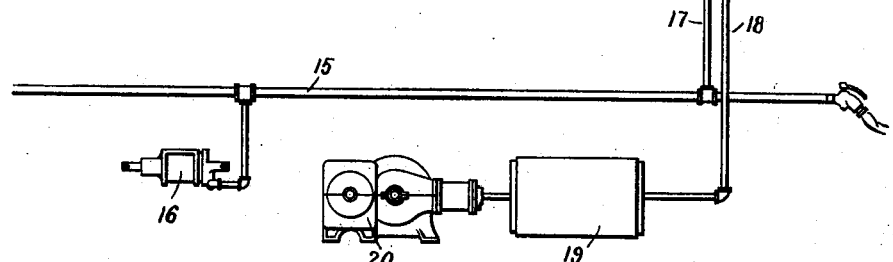
Witnesses.
F. Ellis Glenn.
Helen Orford.
Inventor.
FRED B. COREY.
BY Albert G. Davis
ATTY.

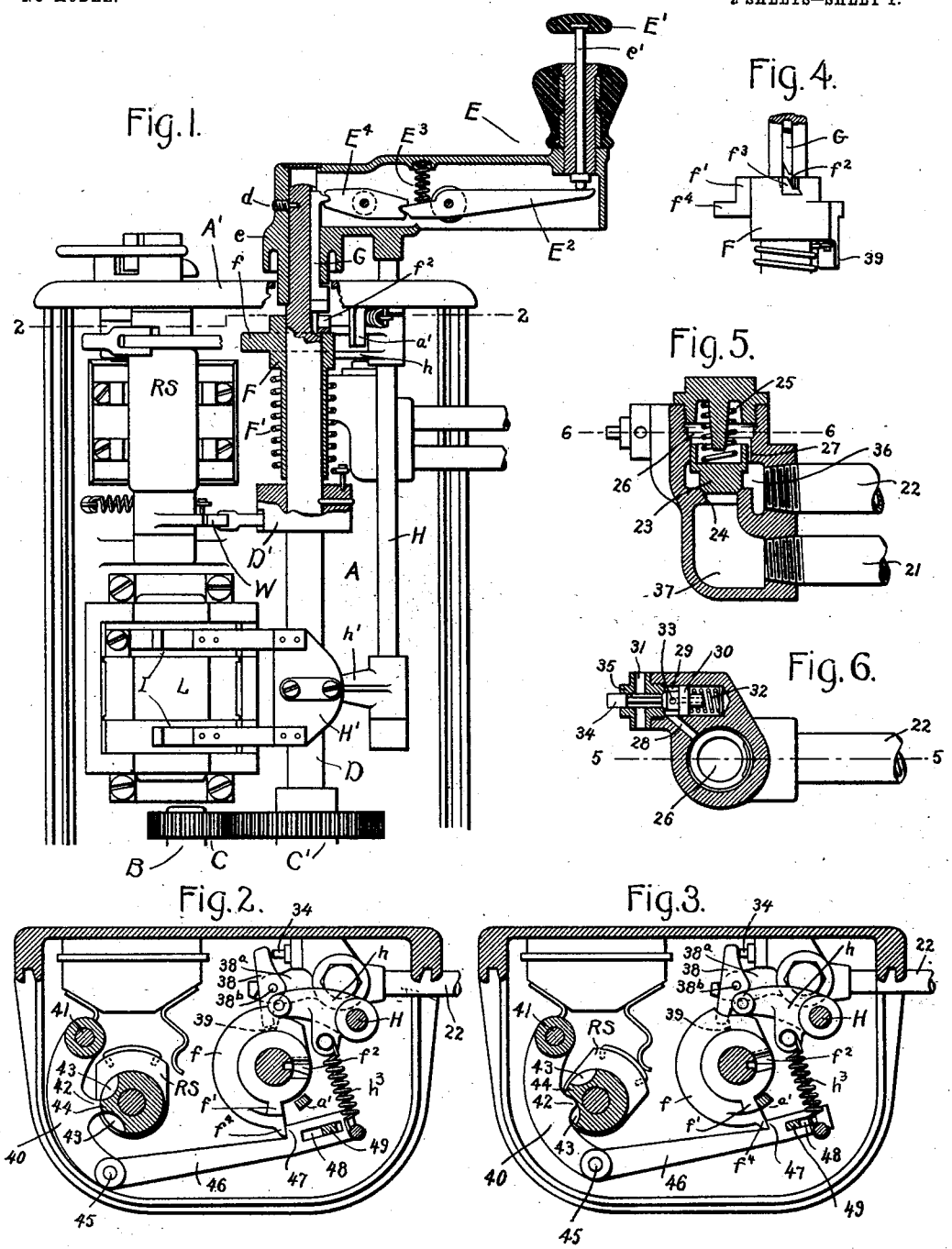

No. 755,750. Patented March 29, 1904.

UNITED STATES PATENT OFFICE.

FRED B. COREY, OF SCHENECTADY, NEW YORK, ASSIGNOR TO GENERAL ELECTRIC COMPANY, A CORPORATION OF NEW YORK.

EMERGENCY-BRAKE.

SPECIFICATION forming part of Letters Patent No. 755,750, dated March 29, 1904.

Application filed July 16, 1903. Serial No. 165,713. (No model.)

*To all whom it may concern:*

Be it known that I, FRED B. COREY, a citizen of the United States, residing at Schenectady, county of Schenectady, State of New York, have invented certain new and useful Improvements in Emergency-Brakes, of which the following is a specification.

My invention relates to improvements in means for automatically controlling motors and power-actuated brakes in case of an emergency and is intended for use especially in connection with electrically-propelled vehicles or trains employing a braking system actuated by compressed fluid.

In air-brake systems, and especially in the so-called "straight" air-brake systems, in which the brakes are applied by increasing the pressure of the air in the train-pipe in contradistinction to "automatic" systems, in which the brakes are applied by the reduction of the pressure in the train-pipe, means other than the engineer's or motorman's valve have heretofore been employed by which the brakes may be applied in case of an emergency. In the so-called "straight" air-brake system such emergency mechanism is liable to be rendered ineffective if the motorman's valve is accidentally or intentionally left in a certain position—viz., the "quick-release" position, in which the train-pipe is connected directly to atmosphere through a wide opening.

The object of my invention is to prevent accident in case the motorman while on duty becomes incapacitated through sudden illness, death, or any other cause.

More specifically stated, the object of my invention is to provide novel means for guarding against the possibility of the automatically-actuated emergency mechanism being rendered ineffective if operated when the motorman's valve is left in a certain position.

The invention therefore consists of the combination, with an emergency-valve which is operated to apply the brakes whenever the operator becomes incapacitated, of a motorman's valve so constructed and arranged that it will automatically move from a position which renders the operation of the emergency-valve ineffective into another position which will not interfere with the effective operation of said emergency-valve.

The said invention constitutes an improvement on the devices shown and described in the application of George Macloskie, Serial No. 148,910, filed March 21, 1903, and my application, Serial No. 148,902, filed March 21, 1903.

In the accompanying drawings, which illustrate the preferred embodiment of my invention, Figure 1 is a front elevation of a specific form of motor-controller to which an emergency-valve has been attached, the casing-cover being removed and certain parts being shown broken away and in section. Fig. 2 is a sectional plan view of the controller on the line 2 2 of Fig. 1, showing the emergency-valve-actuating mechanism in the position corresponding to the "off" position of the motor-controller. Fig. 3 is a sectional plan view similar to the view shown in Fig. 2 and illustrates the emergency-valve-actuating mechanism in the position it assumes just after the emergency-valve is operated. Fig. 4 is an elevation of part of the emergency-valve-actuating mechanism, showing the means actuated from the controller-handle for releasing the emergency-valve and resetting said valve-actuating mechanism. Fig. 5 is a vertical section through the preferred form of emergency-valve on the line 5 5 of Fig. 6. Fig. 6 is a sectional plan view of the emergency-valve on the line 6 6 of Fig. 5. Fig. 7 is a vertical section of the motorman's valve. Fig. 8 is a top plan view of the valve-seat, representing diagrammatically the position of the valve-ports for the "lap" position of the valve. Fig. 9 is a top plan view of a complete motorman's valve. Fig. 10 is a sectional plan view of a portion of the valve-bonnet and the head fitting over the same, taken on the line 10 10 of Fig. 7. Fig. 11 is a top plan view of the rotatable disk-valve removed from its casing; and Fig. 12 is a diagrammatic representation of a straight air-brake system, to which my invention is especially applicable.

Referring now to the drawings, A represents the back of the controller-casing, and E the operating-handle for the controller-cylinder B, mounted within said casing. The controller-cylinder B carries the usual contact-segments and is geared by cog-wheels C and C' to the shaft D, which runs into the hub $e$ of the operating-handle E, the said hub being rotatable in an opening in the cap-plate A' and fastened to the shaft D by means of a set-screw $d$. Rotatably mounted on the shaft D is a sleeve F, maintained yieldingly in its normal position by means of the helical spring F', which is connected at one end to the sleeve and at the other end to the shaft, preferably by means of the collar D', secured to said shaft. The sleeve F carries a cam $f$ and lug $f'$, Fig. 2, the latter serving as a stop by abutting against a stationary lug $a'$ on the under side of the cap-plate.

Connected with the knob E' in the controlling-handle is a pin $e'$, which rests upon the long arm of the lever $E^2$, fulcrumed on the operating-handle E. A spring $E^3$ bears on the short arm of the lever $E^2$ and keeps the pin and knob normally raised. A toothed rocker $E^4$ also is fulcrumed on the operating-handle and engages with the short arm of the lever $E^2$. The other end of the rocker $E^4$ engages with a lug on the upper end of the bolt G, slidable in a keyway in the shaft D and adapted to enter a notch $f^2$, formed in the upper end of the sleeve F. The bolt G will enter the notch $f^2$ whenever the knob E' is depressed, providing the controller is in the off position and acts to lock said sleeve to the shaft. The sleeve F is adapted to be rotated with the shaft D so long as pressure is maintained on the knob E', on which the palm of the motorman's hand is adapted to rest while the controlling-handle is being operated.

Adjacent to the shaft D within the controller-casing is a rock-shaft H, carrying an arm $h$, which bears against the cam $f$, as is clearly shown in Figs. 2 and 3, whereby the movement of said cam will rock the shaft H. Also mounted on the rock-shaft H is an arm $h'$, carrying a block of insulation H', on which are mounted two connected spring contact-fingers which coöperate with stationary contacts, forming therewith a double-pole switch I for closing and opening the power-circuit when shaft H is rocked. The insulating-casing containing the blow-out coil for the switch I is indicated at L. The reversing-switch RS is of the type used in connection with master-controllers for train-control systems employing motor-controllers of the separately-actuated contact type. The customary interlocking mechanism between the said reversing-switch and the shaft D is indicated at W.

Mounted within the controller-casing and operatively connected in the air-brake system is an emergency-valve which is adapted to apply the brakes in case the controller-handle is released by the operator. To apply the brakes when the so-called "automatic" air-brake system is employed, the emergency-valve exhausts the train-pipe to atmosphere, and when the straight air-brake system is employed it connects the source of compressed-fluid supply to said train-pipe. In this application I have chosen to illustrate my invention in connection with the straight air-brake system.

Referring now to the straight air-brake system, (shown diagrammatically in Fig. 12,) the source of compressed-fluid supply, here shown as a motor-driven air-compressor 20, is connected with the train-pipe 15 by way of the motorman's valve V through pipes 17 and 18 and the storage-reservoir 19. The said train-pipe is also connected to the brake-cylinder 16. The emergency-valve P is connected to the pipes 17 and 18 by means of the pipes 21 and 22, respectively. The casing of the emergency-valve P preferably contains two valves—a relay-valve and a controlling or pilot valve for said relay-valve. The relay-valve 23 (shown more clearly in Fig. 5) is adapted to rest upon the valve-seat 24 and is normally maintained upon said seat by means of compressed fluid assisted by the spring 25. The compressed fluid enters chamber 26 above the valve 23 from the chamber 36 through the small passage-way 27, formed in said valve. Communicating with the chamber 26 by means of the passage-way 28 is an auxiliary valve-chamber 29, (see Fig. 6,) containing valve 30, which controls the communication between chamber 26 and the atmosphere through the exhaust-port 31. The said valve 30 is normally maintained on its seat by means of fluid-pressure assisted by the spring 32. The compressed fluid which assists spring 32 enters chamber 29 behind the piston attached to the valve 30 through the passage-way 33 in the valve 30. Attached to the valve 30 is a spindle 34, having formed thereon an annular groove 35. When the spindle 34 is forced inwardly, the valve 30 is raised from its seat and the chamber 26 is exhausted to atmosphere through the passage-way 28 and the exhaust-port 31, and since the passage-way 27 in the valve 23 is small compared with the exhaust-port 31 the pressure in the chamber 36, which is in direct communication with the source of supply, will open the valve 23 against the action of the spring 25, thereby connecting the pipe 22 with the pipe 21 through the chamber 37 and admitting compressed fluid to the train-pipe 15 to cause the brakes to be applied. Such a construction of emergency-valve allows the use of a very small controlling-valve 30, which will require a comparatively small pressure on the spindle 34 to open it. It also allows the use of a relatively large relay-valve which admits air rapidly to the train-pipe in order to apply the brakes quickly. The relay-valve may be located at any desired point outside or inside of the controller-casing, it being only necessary to have the controlling-valve 30 and the actuating mechanism therefor located relatively near and operatively connected with the controlling-handle E.

The mechanism for operating the emergency-valve will now be described.

Pivotally mounted at 38$^b$ on the bracket 38$^a$, attached to the controller-casing or to the emergency-valve casing, is a lever 38, one end of which is adapted to impinge the valve-spindle 34 and the other end of which lies in the path of a projection or lug 39, formed on the under side of the cam $f$. The said projection 39 is adapted to strike the lever 38 so as to cause the controlling-valve 30 to open whenever the controlling-handle is released by the operator, provided the reversing-switch RS is in one or the other of its operative positions. The controller is provided with means whereby the lug 39 may be held out of engagement with the lever 38 and locked in said position when the reversing-switch is moved into its neutral position. The said means, which renders the emergency-valve inoperative when the handle is released by the operator, comprises a lever-arm 40, pivoted to the cap-plate A' at 41, and the link 46, pivoted to the lever-arm 40 at 45. The lever-arm 40 has formed thereon a projection 42, which is adapted to engage the recesses 43 and the projection 44, formed on the reversing-switch cylinder. The recesses 43 correspond to the operative positions of the reversing-switch. The link 46 has formed at its outer end a shoulder 47 and a slot 48. The shoulder 47 is adapted to engage the projection or lug $f^4$, formed on the cam $f$, and the slot 48 coacts with the fixed pin 49, integrally formed with or otherwise attached to the cap-plate A' to form a guide for the reciprocable link 46.

As will be clearly seen by referring to Fig. 4, one side $f^3$ of the notch $f^2$, formed in the upper end of the sleeve F, is inclined in such a manner that as the bolt G, which is beveled at its lower end, is forced down into said notch the sleeve F is rotated about the shaft D and is moved from the position shown in Fig. 3 to the position shown in Fig. 2. This is accomplished by depressing the knob E' in the controlling-handle after the said handle has been brought back to its off position.

Referring now to Fig. 7, 51 represents the body of the motorman's air-brake valve, which is provided with suitable apertured lugs 52, by which it may be secured to any suitable support. The valve-bonnet is designated by 53 and is secured to the body of the valve by the bolts 54. The main reservoir, train-pipe, and atmospheric connections 17, 18, and X respectively communicate through corresponding passages with the ports 17$^a$, 18$^a$, and X' in the valve-body 51. The upper surface of the valve-body 51 forms a seat for the rotary valve-disk 56, which has formed in its under side the communicating ports 57 and 58. (Shown in dotted lines in Figs. 8 and 11.) These ports, which are connected together through the passageway 58$^a$, are adapted to connect the train-pipe either to the main reservoir or to atmosphere in a manner to be hereinafter described. The lower part of this rotary disk valve 56 is provided with a central projection 59, engaging the central socket 60, formed in the valve-seat. The upper surface of said valve is provided with lugs 62 and 63, between which the lug 64 on the lower end of the valve-spindle 65 is adapted to rest when the parts are assembled. The spring 66 secures a satisfactory engagement of the valve 56 with its seat. The valve-spindle 65 is suitably shaped at its upper end to receive the operating-handle 70. Mounted upon the upper end of the valve-bonnet 53 is a head or cap 69, which fits about a portion of the upper end of said bonnet and, through the agency of the spring 71, one end of which is fixed to the cap and the other end of which is fixed to the bonnet, is normally held in such a position that the stop 72 on the cap engages the stop 73 on the bonnet 53, as shown in full lines in Fig. 10. When the handle 70 is in its operative position on the valve-spindle 65, the projection 74, carried by the handle, lies in the same horizontal plane as the projections 76 and 77 on the cap 69 and is adapted to engage said projections when moved into certain positions. In Fig. 10 the dotted-line position of the parts illustrates how the projection 74 on the handle by engaging the projection 77 on the cap 69 would rotate said cap against the tension of the spring 71 until the stop 78 engages with the stop 73. As these stops are arranged the projection 74 on the handle 70 does not engage the stop 77 on the cap 69 until the handle in moving to the left has moved the valve 56 to the "running" position. Therefore the cap 69 is not moved by the movement of the handle between any of the operative positions to the right of the running position; but when it is attempted to move the handle to the left of this position the resistance of the spring 71 is encountered, and should the hand of the motorman be removed from the handle 70 at any point between the running position and the quick-release position or at the quick-release position it would immediately be returned to the running position.

In the operation of the controller and emergency-valve when the motorman places his hand on the operating-handle E he depresses the push-pin $e'$ and forces the bolt G down into the notch $f^2$ in sleeve F. The rotation of the handle operates first to close the cut-out switch I by operating the rock-shaft H, through the agency of the sleeve F and the cam $f$, and then to control the motor-circuits by means of the controlling-cylinder B. With the operating-handle in its off position and the reversing-switch in its neutral position the emergency-valve-actuating mechanism is in the position shown in Fig. 2, the lever 38 being out of engagement with or lightly resting against the end of the valve-spindle 34. When the reversing-switch is thrown into one of its operative positions and the handle E is moved forward after depressing the knob E', the sleeve $f$ is rotated with the shaft D, and the projection 39 is moved away from the lever 38, and the lug or projection $f^4$ is moved out of engagement with the shoulder 47. If now the motorman removes his hand from the operating-handle, the sleeve F is unlocked, and the spring F' instantly turns the said sleeve backward until the lug $f'$ strikes the stop $a'$ on the cap-plate, as shown in Fig. 3. In this position of the sleeve the projection 39 engages with one arm of the lever 38 and forces the other arm of said lever into engagement with the valve-spindle 34, thereby opening the controlling-valve 30, which in turn causes the compressed fluid from the chamber 26 of the emergency-valve to be exhausted to atmosphere and allows the valve 23 to open communication between the source of compressed-fluid supply and the train-pipe, as has been heretofore described. Also in this position of the sleeve the cam $f$ allows the cut-out switch to be thrown open by means of spring $h^3$. The brakes are now applied and the motor-circuit is broken. In order to release the brakes after they have been applied by the operation of the emergency-valve, provided the motorman's valve is in its normal running position and without operating said motorman's valve, and also to reset the emergency-valve-actuating mechanism, is is merely necessary to turn the controller-handle back to its initial or off position and press the knob E', so as to force the lower end of the bolt G into engagement with the inclined side $f^3$ of the slot $f^2$, thereby rotating the sleeve F about the shaft D and moving the lug 39 away from the lever 38. The controlling-valve 30 is thus allowed to close under the action of the spring 32, and as the pressures in the chambers 26 and 36 are almost instantly equalized the valve 23 is allowed to close under the action of spring 25, assisted by said fluid-pressure, and cuts off the communication between the train-pipe and the source of supply.

In the straight air-brake system the source of compressed-fluid supply is normally disconnected from the train-pipe, and the train-pipe is normally connected to atmosphere through a small exhaust-port or contracted passage-way in the motorman's valve, the motorman's valve being in the position known as the "running" position. Therefore when the brakes are applied by means of the emergency-valve a slight leaking takes place through this small exhaust-port in the motorman's valve; but this leaking will not be sufficient to render the emergency-valve inoperative to apply the brakes. By constructing the motorman's valve in this manner and maintaining it normally in the running position it will be seen that the brakes will be slowly released when the emergency-valve is closed after applying the brakes.

In operating the motorman's valve to apply the brakes the handle of said valve is moved into either the service-stop position (indicated by SS) or the emergency-stop position, (indicated by ES,) depending upon the rapidity with which it is desired to stop the car or train. In both said positions the ports 57 and 58 are brought into register with the ports 18$^a$ and 17$^a$, respectively, in the service-stop position with considerable lap and in the emergency-stop position with no lap at all. When it is desired to release the brakes after applying the same by the operation of the motorman's valve, the handle 70 is moved to either the running position, (designated by R,) or the quick-release position, (designated by QR.) When moved to the former position, the extension 57' of the port 57 overlaps the port 17$^a$ and a connection through a contracted passage-way is made from the train-pipe to atmosphere, thus allowing the train-pipe pressure to gradually fall to that of the atmosphere and slowly release the brakes. When the handle is moved to the quick-release position, the ports 57 and 58 register with the ports 17$^a$ and X, respectively, thus connecting the train-pipe to atmosphere through a large opening and allowing the train-pipe pressure to be reduced suddenly to that of atmosphere. It will be seen that if the motorman's valve is allowed to remain in the quick-release position at any time when it is desired to operate the air-brakes by means of the emergency-valve the said emergency-valve would be rendered inoperative, due to said large opening between the train-pipe and the atmosphere, the compressed fluid in this case merely flowing directly from the source of supply through the emergency-valve and the ports in the motorman's valve to atmosphere instead of to the train-pipe to apply the brakes.

The purpose of the yieldingly-mounted head or cap 69 and its coöperative stops previously described is to move the valve 56 from the quick-release position to the running position in case of injury to the motorman or carelessness on his part in leaving said valve in the quick-release position, so that unless wilfully held in the quick-release position the motorman's valve will not prevent an effectual operation of the emergency device to apply the brakes when the motorman becomes incapacitated.

The specific construction of the working parts of the motor-controller herein shown and described forms no part of my present invention, since it forms the subject-matter of a copending application of Frank E. Case, Serial No. 75,488, filed September 16, 1901. It is merely illustrated and described here to more clearly show how my invention may be applied to the type of master-controller generally employed in train-control systems. It will be readily understood that the invention is not limited in its application to any specific type of motor control.

Although I have shown and described my invention in connection with a straight airbrake system—that is, a system in which the motorman's valve admits compressed fluid directly from a storage-cylinder to the brake-cylinders through the train-pipe—it is equally applicable to an automatic system, in which case the emergency-valve is arranged to discharge the train-pipe instead of admitting air from the storage-reservoir to said train-pipe, and the motorman's valve is preferably arranged to operate automatically in a manner such as is shown and described in the patent to Howe and Gartner, No. 321,971, granted July 14, 1885.

I do not herein claim the above-described motorman's valve and means for returning the valve automatically from the quick release to the running position, since that forms part of the subject-matter of my application, Serial No. 154,430, filed April 27, 1903; but I aim to cover in the claims hereto appended all modifications of my invention as hereinbefore set forth which do not involve a departure from its spirit and scope.

What I claim as new, and desire to secure by Letters Patent of the United States, is—

1. In combination, a brake actuated by fluid-pressure, a motorman's valve for controlling the operation of said brake, a motor-controller, an emergency-valve for applying said brake, means for operating said emergency-valve to cause the brake to be applied when the controller-handle is released by the operator, and means for preventing said motorman's valve from being left in such a position as to render the operation of the emergency-valve ineffective to apply the brake.

2. The combination with an air-brake system, of a motorman's valve for controlling the operation of the brakes, an emergency-valve operatively connected to the air-brake system, means for operating said emergency-valve to cause the brakes to be applied when the operator becomes incapacitated, and means for moving the motorman's valve automatically from a position in which the operation of the emergency-valve is rendered ineffective into a position which does not prevent the brakes from being applied by the emergency-valve.

3. In combination, a motorman's valve for an air-brake system constructed and arranged to connect the train-pipe to main reservoir through wide and restricted passages for certain positions of said valve and to atmosphere through wide and restricted passages for other positions of said valve, an emergency-valve operatively connected to the air-brake system, means for operating said emergency-valve to cause the brakes to be applied when the operator becomes incapacitated, and means for moving the motorman's valve automatically from a position in which the operation of the emergency-valve is rendered ineffective into a position which does not prevent the brakes from being applied by the emergency-valve.

4. In combination, a motorman's valve for an air-brake system constructed and arranged to connect the train-pipe to main reservoir through wide and restricted passages for certain positions of said valve and to atmosphere through wide and restricted passages for other positions of said valve, a motor-controller, an emergency-valve operatively connected to the air-brake system, means operatively connected to the motor-controller for actuating said emergency-valve to cause the brakes to be applied when the operator becomes incapacitated, and means for moving the motorman's valve automatically from a position in which the operation of the emergency-valve is rendered ineffective into a position in which the emergency-valve operates effectively to cause the brakes to be applied.

5. In combination, a motorman's valve for an air-brake system constructed and arranged to connect the train-pipe to main reservoir through wide and restricted passages for certain positions of said valve and to atmosphere through wide and restricted passages for other positions of said valve, a controlling-handle, an emergency-valve operatively connected to the air-brake system, means operatively connected to said handle for actuating said emergency-valve when the controlling-handle is released by the operator, and means for moving the motorman's valve automatically from a position in which the operation of the emergency-valve is rendered ineffective to apply the brakes into a position which does not prevent the effective operation of the emergency-valve.

6. In combination, a motorman's valve for an air-brake system constructed and arranged to connect the train-pipe to main reservoir through wide and restricted passages for certain positions of said valve and to atmosphere through wide and restricted passages for other positions of said valve, a motor-controller, an emergency-valve operatively connected to the air-brake system, means operatively connected to the motor-controller for opening the motor-circuit and for actuating said emergency-valve to cause the brakes to be applied when the operator becomes incapacitated, and means for moving the motorman's valve automatically from a position in which the operation of the emergency-valve is rendered ineffective into a position in which the operation of the emergency-valve will cause the brakes to be applied.

7. In combination, a motorman's valve for an air-brake system constructed and arranged to connect the train-pipe to main reservoir through wide and restricted passages for certain positions of said valve and to atmosphere through wide and restricted passages for other positions of said valve, a motor or motors, a motor-controller therefor, a controlling-handle, an emergency-valve, means for opening the motor-circuit and for operating said emergency-valve when the handle is released by the operator, and means for moving the motorman's valve automatically from a position in which the operation of the emergency-valve is rendered ineffective into such a position that the brakes may be applied when the emergency-valve is operated.

8. In combination, a motorman's valve for a "straight" air-brake system, means for returning said valve automatically to the "running" position when the operating means for said valve is released by the operator in the "quick-release" position or in any intermediate position between said "quick-release" and "running" positions, a motor-controller, an emergency-valve operatively connected to said air-brake system, and means for operating said emergency-valve to cause the brakes to be applied when the operating means for said controller is released by the operator.

In witness whereof I have hereunto set my hand this 14th day of July, 1903.

FRED B. COREY.

Witnesses:
BENJAMIN B. HULL,
HELEN ORFORD.